United States Patent [19]

Hale et al.

[11] Patent Number: 5,412,421
[45] Date of Patent: May 2, 1995

[54] MOTION COMPENSATED SENSOR

[75] Inventors: Robert A. Hale, Ellicott City, Md.;
Harvey C. Nathanson, Pittsburgh, Pa.

[73] Assignee: Westinghouse Electric Corporation, Pittsburgh, Pa.

[21] Appl. No.: 122,134

[22] Filed: Sep. 15, 1993

Related U.S. Application Data

[63] Continuation of Ser. No. 876,596, Apr. 30, 1992, abandoned.

[51] Int. Cl.$^6$ ............................................. H04N 7/18
[52] U.S. Cl. ..................................... 348/208; 348/147
[58] Field of Search ............... 358/105, 109, 110, 113, 358/125, 126, 222; H04N 7/18; 348/113, 144, 164, 162, 145, 147, 326, 208, 345, 699, 701, 373

[56] References Cited

U.S. PATENT DOCUMENTS

| | | | |
|---|---|---|---|
| 3,261,014 | 7/1966 | Diaz | 358/110 |
| 3,638,502 | 2/1972 | Leavitt et al. | 358/222 |
| 4,245,254 | 1/1981 | Svensson et al. | 358/222 |
| 4,516,158 | 5/1985 | Grainge et al. | 358/109 |
| 4,788,596 | 11/1988 | Kawakami et al. | 358/222 |
| 4,912,770 | 3/1990 | Seto et al. | 358/109 |
| 4,959,725 | 9/1990 | Mandle | 358/222 |
| 5,060,074 | 10/1991 | Kinugasa et al. | 358/222 |
| 5,109,249 | 4/1992 | Kitajima | 358/222 |
| 5,155,520 | 10/1992 | Nagasaki et al. | 358/222 |
| 5,166,789 | 11/1992 | Myrick | 358/109 |
| 5,317,394 | 5/1994 | Hale et al. | 348/208 |

*Primary Examiner*—Howard W. Britton
*Assistant Examiner*—Richard Lee

[57] ABSTRACT

A sensor produces signals corresponding to positions of objects within a field of view over time. A motion detector is provided for determining movement of the sensor. Signals from the sensor and the detector go to a processing unit which causes an appropriate modification of the signal received from the sensor to compensate for the movement.

9 Claims, 2 Drawing Sheets

MOTION COMPENSATED SENSOR

This application is a continuation of application Ser. No. 07/876,596, filed Apr. 30, 1992, now abandoned.

BACKGROUND OF THE INVENTION

1. Field of the Invention

This invention relates to a sensor which when subject to motion or vibration adjusts its output accordingly.

2. Description of the Prior Art

Various types of sensors have been used to record events occurring at a selected location over time. These sensors could be anything from video cameras to infrared detectors. Typically, the sensors produce analog signals corresponding to the scene which they observe. The analog signals are digitized to create digital images of the scene. Those digital images can be stored in a memory, displayed on a screen or directed to a variety of processing systems which may either extract information from the image or modify the image in accordance with predetermined procedures.

One or more sensors may be mounted to a host platform. When several sensors are used their signals must often be combined to generate a useful image. In some situations sensors must be mounted on platforms which flex, vibrate or move in any direction. All such types of motion in any degree shall be hereinafter called movement. Platform movement can cripple efforts to combine signals from sensors that are mounted on the moving platform. For example, a 100° per second motion would move scene data across 116 pixels if each detector's Instantaneous Field of View (IFOV) is 150 μr and the integration time is 0.01 seconds. Vibration levels can reach 10 pixels, peak to peak on common aircraft platforms. The resulting loss of signal to noise ratio as well as spatial information is a major problem.

Intra-sensor alignment is important for tracking and clutter discrimination. Relating data to a common inertial reference frame is also important for "pointing" targeting systems accurately. For multiple sensors sensor-to-sensor alignment is important. Sensors must be maintained in relative alignment to one another or the signals from them must be corrected to account for any misalignment which occurs. Moreover, the signals from the sensors must be integrated and normalized in a relatively short time to account for overlaps in fields of view among the sensors, and movement of sensors resulting from vibration or movement of the platform on which the sensors have been mounted.

Consequently, there is a need for sensor which can detect and compensate for motion, flexure and vibration. Such sensors should also be either positioned or movable to cover a wide field-of-regard.

SUMMARY OF THE INVENTION

We provide a sensor capable of detecting and compensating for flexure, vibration and other motion of the platform on which it is mounted. We provide a motion detector on the sensor. The motion detector detects vibration and directional motion, hereinafter called "movement" of the sensor. We also prefer to provide a means for adjusting the sensor in response to detected movement of the platform holding the sensors. In the present preferred sensor we provide a lens having a servo motor. The servo motor is activated in response to detected movement. Then the servo motor adjusts the lens to compensate for such movement. We prefer to utilize an infrared detector in our sensor.

We also prefer to provide a internal navigation system which establishes a reference plane in the internal navigation system. The sight lines of all sensors are at known relative positions with respect to the reference plane. Whenever vibration or other motion occurs to change the sight line of a sensor the navigation system provides a reference for adjusting the output of the sensor to compensate for the movement which has occurred.

We also prefer,to provide a normalizing means for adjusting the output signals received from the sensors. Normalizing means is preferably used to compensate for variations in output among sensors. The normalizer can also compensate for signal strength variations and signal gain among the sensors.

Other objects and advantages of the present invention will become apparent from a description of the certain preferred embodiments of the figures.

DESCRIPTION OF THE PREFERRED EMBODIMENTS

Figure 1:
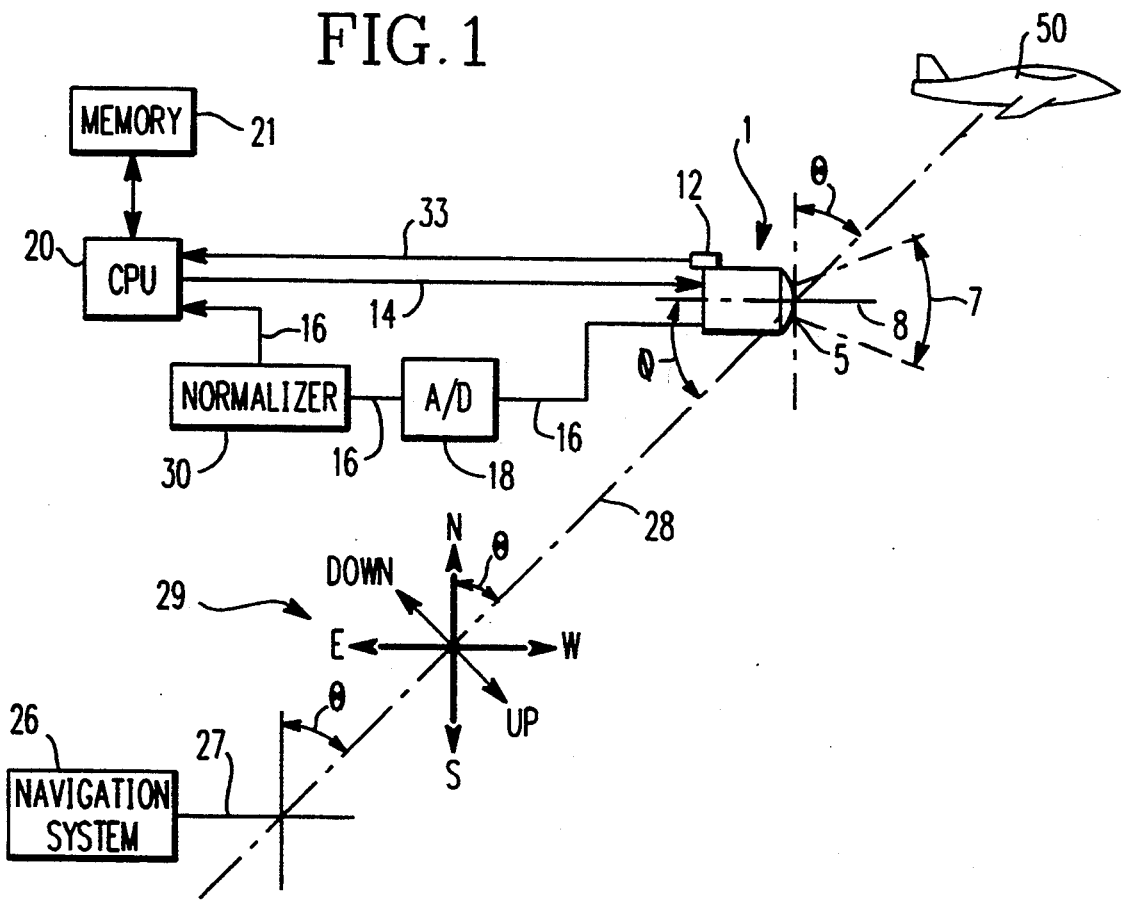
FIG. 1 is a diagram of a present preferred embodiment of our sensor and navigation system illustrating positioning of the sensor relative to the target.

Referring to FIG. 1 we provide a sensor 1 having a housing 2 and sensor surface 4. The sensor 1 is mounted on platform 6. The sensor preferably has a lens 5 which provides a field of view 7. Typically, the field of view will be about sight line 8 which passes through the sensor. We also to provide a motion detector 12 on the sensor to detect the movement and vibration of the platform 6 and sensor 1 mounted thereon. A processing unit 20 directs the sensor through line 14. The sensor generates a signal which is output over line 16 and through analog digital convertor 18. The digitized signal may be directed into a memory, image processor, screen or other device. A memory 21 connected to the processing unit 20 contains programs for directing the sensor and for utilizing signals received from the sensor. One program adjusts the signal according to detected motion or vibration of the sensor.

Figure 2:
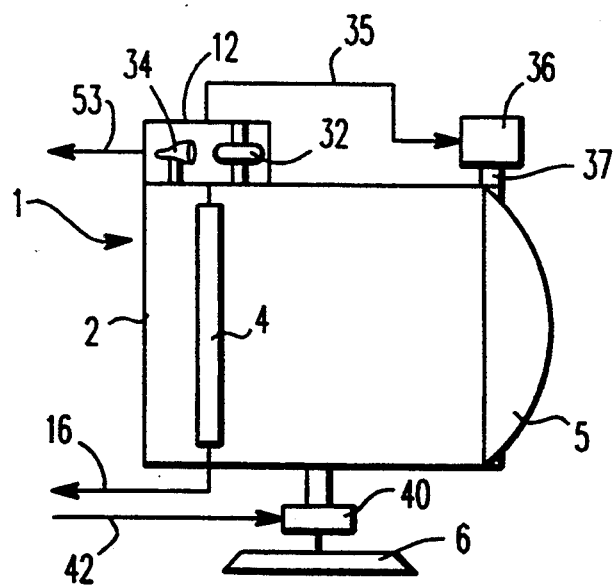
FIG. 2 is a side view of a present preferred sensor which has been cut away to show major components of our present preferred sensor.
Figure 3:
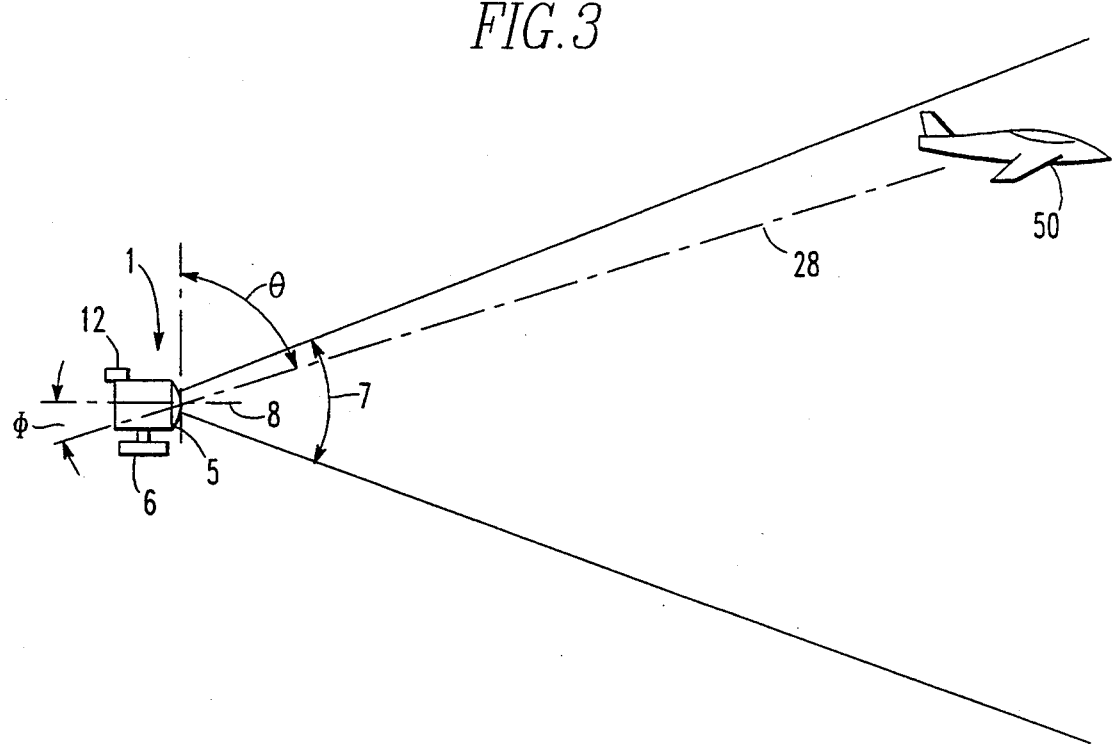
FIG. 3 is a schematic view similar to FIG. 1 showing the target within the field of view of the sensor.

We have found that in many sensor systems, signal outputs can vary among sensors looking at the same image. It is, therefore, necessary to normalize the signals so that any given point will produce the same signal from every sensor. Accordingly, we provide a normalizer 30 for making such corrections. The normalizer usually would have a processing unit and memory which contains a program. The program would have algorithms for modifying the digital image in accordance with a predetermined sequence. The predetermined sequence may be developed by testing the sensors and determining variations in output among sensors based upon that testing. We also prefer to provide a navigation system 26 connected to processing unit 20. The navigation system generates a reference plane 27. We can consider that reference plane to be parallel to the X-axis in direction indicator 29. If one considers line 28 from the target 50 to the reference plane 27, we see that line 28 is at some angle θ from a vertical line passing through navigation plane 27. When sensor 1 is in alignment with the navigation system sight line 8 will be at some known relative position with respect to plane 27. In FIG. 1 sight line 8 is parallel to plane 27. Hence, a line from target 50 passing through the sight line will produce the same angle θ relative to a line perpendicular to sight line 8 and corresponding angle φ between line 28 and sight line 8. See FIGS. 1 and 3. If sensor 1 is moved because of vibration or movement of the platform to which the sensor is mounted, angle θ will change. Since the reference plane 27 remains in the same position, it is necessary to adjust for the change in angle θ. Before such an adjustment can be made, however, one must determine the amount of movement of sensor 1. This is accomplished through the use of motion detector 12. As shown in FIG. 2 the motion detector preferably contains a gyroscope 32 and accelerometer 34. The motion detector 12 generates a signal which passes along line 33 to processing unit 20. We prefer also to provide a second line 35 from the motion detector to a servo motor 36. The servo motor 36 responds to the information received from motion detector 12 by adjusting lens 5. This can be done by turning support 37 on which lens 5 has been mounted. Within the detector 1 we provide a sensor surface 4 which generates a signal in response to light passing from the scene through lens 5. That signal is directed along line 16 to the processing unit. The detector is mounted on platform 6. One may provide an additional servo motor 40 controlled by the processing unit 20 through input 42. Servo motor 40 is used to make major changes in the position of the sensor 1.

Thus, our sensor may compensate for motion, flexure, vibration and other motion in any or all of at least three ways. The sensor could be moved with servo motor 40. The sensor lens 5 can be changed. These changes can occur in addition to adjusting the signal emitted from the sensor. Consequently, should our sensor be moved or vibrated, a useful signal will continue to be generated.

Although we have shown certain present preferred embodiments of our image detection and tracking system, it should be understood that our invention is not limited hereto, but may be variously embodied within the scope of the following claims.

It is claimed:

1. A sensor capable of sensing objects within a field of view about a sight line having a known relative position, the sensor producing signals corresponding to positions of objects within the field of view at a given time comprising:
   a) a housing;
   b) a sensor surface which produces sensor signals in response to at least one of light waves and radio waves striking the sensor surface;
   c) a detector mounted on the housing which can detect movement of said sensor and emit signals corresponding to detected movement of said sensor;
   d) at least one processing unit and associated memory containing a program for adjusting said sensor signals in response to detected movement of the sensor, the processing unit connected to the sensor surface and the detector for receiving said sensor signals from at least one of the sensor surface and the detector and modifying the sensor signals received from the sensor surface in accordance with signals received from the detector;
   e) adjustment means for moving at least a portion of the sensor in response to detected movement of the sensor, and
   f) an internal navigation system which establishes a reference plane at a selected distance from the sight line of said sensor, the internal navigation system being connected to the adjustment means for adjusting the sensors to maintain a desired spatial relationship between the reference plane and the sight line of the sensor.

2. The sensor of claim 1 wherein the detector comprises at least one of a gyroscope and an accelerometer.

3. The sensor of claim 1 also comprising a lens attached to the sensor and the adjustment means and wherein the adjustment means comprises a motor for moving the lens.

4. The sensor of claim 1 wherein the internal navigation system which establishes a reference plane, is connected to the processing unit.

5. The sensor of claim 1 wherein the sensor surface is capable of sensing at least one of visible light, infrared light and radar signals.

6. The sensor of claim 1 also comprising normalizing means connected to the sensor for normalizing signals received from the sensor.

7. The sensor of claim 6 wherein the normalizing means comprises a processing unit and associated memory containing a program for modifying the signals in a desired manner.

8. The sensor of claim 7 wherein the normalizing means adjusts the signals to normalize for one of signal gain and variation in output among sensors.

9. A sensor for use with a navigation system which establishes a reference plane, the sensor being capable of sensing objects within a field of view about a sight line having a known relative position relative to the reference plane, the sensor producing signals corresponding to positions of objects within the field of view at a given time comprising:
   a) a housing;
   b) a lens attached to the housing through which the sight line extends and positioned to direct at least one of light waves and radio waves onto a sensor surface;
   c) a sensor surface which produces sensor signals in response to said at least one of light waves and radio waves striking the sensor surface;
   d) a detector mounted on the housing which can detect movement of said sensor and emit signals corresponding to detected movement of said sensor;
   e) adjustment means for moving the lens in response to said detected movement of the sensor to maintain the known relative position of the sight line relative to the reference plane;
   f) at least one processing unit and associated memory containing a program for activating said adjustment means and adjusting said sensor signals in response to said detected movement of the sensor, the processing unit connected to the sensor surface, adjustment means and the detector for receiving said sensor signals from at least one of the sensor surface and the detector and modifying the signals received from the sensor surface in accordance with signals received from the detector, and
   g) an internal navigation system which establishes a reference plane at a selected distance from the sight line of said sensor, the internal navigation system being connected to the adjustment means for adjusting the sensors to maintain a desired spatial relationship between the reference plane and the sight line of the sensor.

* * * * *